United States Patent Office 3,468,987
Patented Sept. 23, 1969

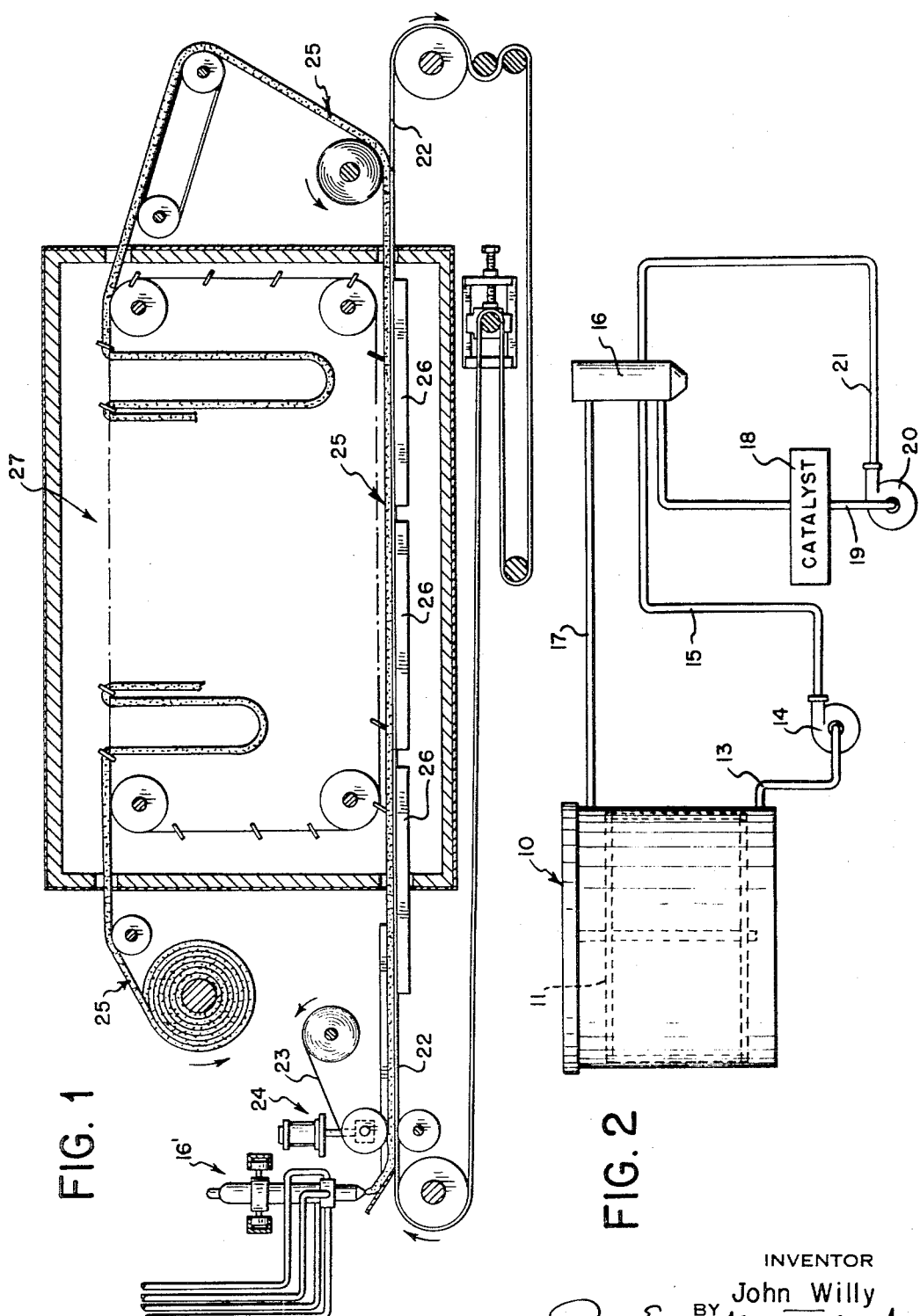

3,468,987
METHOD OF PREPARING AND MOLDING
CHEMICAL FOAMING MIXTURES
John Willy, Attleboro, Mass., assignor to Specialty
Converters, Inc., a corporation of Delaware
Continuation-in-part of application Ser. No. 261,041,
Feb. 26, 1963. This application Mar. 2, 1966, Ser.
No. 540,781
Int. Cl. B29d 3/00
U.S. Cl. 264—28                                    4 Claims

ABSTRACT OF THE DISCLOSURE

A method of preparing a chemical foaming mixture in which a prepolymer reaction product is rapidly cooled to a temperature below the freezing point of the isocyanate compound in the reaction product, while the compound is simultaneously vigorously agitated to prevent extended crystal growth during freezing of the isocyanate and to provide minute isocyanate crystals which are insoluble in the hydroxyl-containing compound. Thereafter the reaction product containing the frozen isocyanate is intimately mixed with a catalyst mixture containing water and a catalyst. While the water will react with the reaction product to form a chemical foaming mixture, the reaction product is at a temperature low enough to retard gas generation during mixing and the minute isocyanate crystal formations become dispersed homogeneously throughout the chemical foaming mixture. Thus the chemical foaming mixture can be spread before the temperature rises giving greater control over foam formation and resulting in a higher quality foam product.

---

This is a continuation-in-part of my copending application Ser. No. 261,041, filed Feb. 26, 1963, now abandoned.

This invention relates to a method of preparing chemical foaming mixtures and more particularly to a method of producing an improved chemical foaming mixture in which a fluid mixture prepolymer containing an isocyanate compound is simultaneously agitated while being cooled to a temperature below the freezing point of the isocyanate compound prior to mixing with a catalyst mixture to prevent extended crystal growth during freezing of the isocyanate and provide minute crystal formation of the isocyanate.

In the formation of chemical foaming mixtures for the production of polyurethane foam products, it is essential that the prepolymer reaction product be prepared in such a manner that it becomes thoroughly dispersed within a catalyst to produce a controlled reaction that will result in a foam product having a substantially uniform cellular structure throughout. Since these chemical foaming mixtures are generally used in apparatus for continuously forming thin foam sheets in which the chemical foaming mixture must be carefully spread and its thickness metered before any reaction may be permitted to occur, it is equally important that the prepolymer and catalyst be prepared to provide an extended delay period before chemical reaction of the foaming mixture takes place. The method heretofore followed as described in U.S. Patents Nos. 2,956,310 and 2,957,207 has been to mix the prepolymer reaction product and then cool the reaction product below its reaction temperature and maintaining it at this low temperature during spreading and metering. This method often resulted in satisfactory foam but the degree of control was too uncertain to predict formation of a reliable foam product every time. For example, in spite of the precise maintenance of temperature control required by these patents, inability to control humidity during high atmospheric seasons particularly interfered with the formation of quality foam as condensed water droplets often marred the surface characteristics of the foam or added enough water to the mixture to cause the chemical ratio of the foam mixture to go out of balance with resultant foam collapse.

I have found that mere cooling of the reaction product to an even lower temperature than that specified in these patents was insufficient to solve the problem of inferior foam. It is generally known that there is a tendency for toluene diisocyanate to crystallize out of the commercial grade at temperatures below about 38° F. to 71° F. depending upon the isomer content. It has been found that if a prepolymer reaction product containing toluene diisocyanate is frozen under normal cooling processes, the toluene diisocyanate tends to form an extended growth crystalline structure which, depending upon the crystallization that has taken place, will inhibit the formation of good quality foam in that it will not readily react further after it has been frozen. It is theorized that under these normal cooling processes, a few single crystals would be formed at the high temperature freezing point of toluene diisocyanate and, as the cooling process continues, these crystals, as seeds, would form the nucleus of further crystallization and crystallization growth so that the finally cooled product would contain a small number of very large crystals, each of which contain many molecules of toluene diisocyanate. It is believed that under such conditions, the mixture could not be considered to be as readily available for further reaction. Accordingly foam products produced by reaction of this non-homogeneous foaming mixture, are either not fully reacted or react irregularly to form a non-uniform cellular structure.

I have found that in spite of the hazards of cooling the prepolymer to below the freezing point of any excess isocyanate, it is precisely by freezing the prepolymer reaction product in a manner to be described that unusually good control is maintained over the chemical foaming mixture whereby good quality foam can be produced consistently. The method of the invention is for preparing a chemical foaming mixture which comprises providing a fluid mixture prepolymer reaction product of a hydroxyl-containing resinous compound and a stoichiometric excess of an organic isocyanate compound which is capable of combining with the hydroxyl-containing compound to form polyurethane foam. The reaction product is rapidly cooled to a temperature below the freezing point of the isocyanate compound to freeze all the isocyanate out of the prepolymer solution while simultaneously vigorously agitating the reaction product to prevent extended crystal growth during freezing of the isocyanate and provide minute isocyanate crystals. The cooled reaction product is then intimately mixed with a catalyst mixture containing water and a catalyst for the reaction between water and the reaction product to form a chemical foaming mixture in which the reaction product is at a temperature low enough to retard gas generation during mixing and for a period thereafter the minute isocyanate crystal formations are thereby dispersed homogeneously throughout the chemical foaming mixture. The mixture is then discharged and spread before the temperature is raised to the point of gaseous reaction and the foaming mixture is ultimately reacted by raising its temperature to the reaction temperature.

The above method is particularly applicable to a fluid mixture prepolymer of a hydroxyl-containing resinous compound and a stoichiometric excess of an isocyanate compound having about 80% 2,4 toluene diisocyanate and about 20% 2,6 toluene diisocyanate, in which the isocyanate compound is frozen into minute isocyanate crystals by simultaneously agitating and rapidly cooling the prepolymer to a temperature below the freezing point of the isocyanate, which is below 25° F. The method described is in its most practical application used in combination with a method of casting thin cellular foam sheets wherein a chemical foaming mixture is spread and allowed to expand in a carrier belt until fully expanded and then is stripped from the carrier belt.

It has been determined that the rapid cooling under agitation prevents crystal growth. Thus, by rapidly cooling the prepolymer to a temperature below the freezing point of the isocyanate compound, the toluene diisocyanate in the prepolymer becomes solidified as minute isocyanate crystals, which are theorized to be substantially mono-molecular crystals in which condition they are no longer soluble in, nor reactive with, the reaction product containing the active hydroxl-groups. They remain suspended in the viscous hydroxyl-containing resinous compound as finely divided inert bodies. They are so homogeneously dispersed and so tiny that they are available for instant resolution and spontaneous reaction in the presence of the catalyst mixture at the moment of temperature increase.

A preferred embodiment of the method of the invention is described hereinbelow with reference to the drawing wherein:

FIG. 1 is a side elevation partly in section of apparatus for casting thin cellular foam sheets, and FIG. 2 is a schematic of a cooling tank and circulatory means for the practice of the method.

In a first example a fluid mixture prepolymer reaction product consisting of a hydroxyl-containing resinous compound, here a polyester and a stoichiometric excess of a mixture of 80% 2,4 toluene diisocyanate and 20% 2,6 toluene diisocyanate were provided. To about 100 parts by weight of this mixture is added about 0.5 part by weight of silicone oil to form the desired prepolymer mixture. This is a common prepolymer mixture used in commercial type plastic foam, namely polyurethane, which is formed from a polyisocyanate (especially toluene diisocyanate) and a hydroxyl-containing resinous compound (e.g. glycols, polyols, polyesters, or polyethers). The prepolymer reaction product was placed in a refrigeration tank 10 having an agitator 11 rotatable therein to place the prepolymer in an agitated state as shown in FIG. 2. The tank is designed to cool the prepolymer rapidly to a temperature below the freezing point of the isocyanate compound. With the prepolymer reaction product described it was found that by rapid cooling to below 25° F. and even to 15° F. while agitating, substantially monomolecular crystals were formed and dispersed homogeneously throughout the prepolymer. After the prepolymer was cooled to below 23° F. it was retained in the tank 10 under constant agitation until it was desired to be used. Then an amount of the cooled prepolymer was drawn from the tank through an outlet line 13 which is connected to a pump 14. The pump 14 pumps the prepolymer through a feed line 15 into a mixing head 16. The mixing head 16' is of the usual type which contains a valve by means of which the prepolymer being fed thereto is discharged through the mixing head or is returned to the prepolymer tank 10 through return lines 17. Similarly extending from a catalyst reservoir 18 is an outlet 19 leading to a pump 20 which served to pump the catalyst through catalyst feed line 21 and to the mixing head 16. The mixing head 16 contains a second valve means so that the prepolymer conveyed thereto can be discharged through the mixing head and re-circulated to the catalyst reservoir 18. Here the prepolymer was mixed with a prepared catalyst mixture which comprised 0.5 part by weight of N,N,N',N'-tetramethylbutane diamine, 1.0 part of triethylene diamine dissolved in 2.3 parts by weight of distilled water.

In a second example of a fluid mixture prepolymer reaction product 95 parts by weight of an 80:20 mixture of the 2,4 and 2,6 isomers of toluene diisocyanate were placed in a reaction vessel. To the toluene diisocyanate there were added 450 parts by weight of polypropylene glycol having an average molecular weight of 2000. The materials reacted with evolution of heat and mixing was continued until a temperature peak was reached and then dropped back about 5° C. at which time the mixture was heated with stirring to 140° C. and analyzed for NCO content. Additional toluene diisocyanate to the extent of 80 parts by weight was added with stirring to bring the free NCO group content up to about 9.5%. To the resultant mixture three parts by weight of a fluid silicone oil of 50 centistokes at 25° C. viscosity were added and mixed in. The resultant mixture was cooled to room temperature (75° F.).

In this example the tank 10 was jacketed on the outside with coils containing monochlorodifluoromethane $CHClF_2$ at a temperature of $-10°$ F. and was equipped with turbo agitators and additional cooling on the inside of the tank. On heat transfer contact with the extremely cold coils, a small quantity of prepolymer cooled almost instantly. Larger volumes were cooled at the rate of 300 lbs. per hour to the desired 20° F.

It was observed that the mixed isomers of 2,4 and 2,6 toluene diisocyanate are mutually soluble in one another causing their respective freezing points to be lowered. The 2,4 isomer, of which there is 80% begins to freeze and crystallize out at a temperature just below 59° F. As it does so, the remainder of the reaction product becomes more concentrated with respect to the dissolved 2,6 isomer and the freezing point is further lowered. As the temperature continues to drop, crystallization continues to change the concentration of the remaining liquid and the freezing point continues to be depressed until the temperature falls below 25° F., at which point the remainder of the isocyanate isomers will solidify as a complex cryohydrate of the two substances. By vigorous agitation while freezing the isocyanate, extended crystalline growth was prevented and only minute frozen isocyanate crystals were formed homogeneously dispersed throughout the reaction product. It is preferred to form crystals comprising single molecules but a crystal formation containing only a small number of molecules is satisfactory. The frozen diisocyanate crystals are thereby frozen out of solution but remain suspended and homogeneously dispersed throughout the viscous hydroxyl-containing resinous compound as finely divided inert bodies. The prepolymer reaction product was then mixed with a catalyst mixture which was prepared by mixing with agitation 2.3 parts by weight distilled water, 0.5 part by weight triethylene diamine and 1.0 part by weight N,N,N'N'-tetramethyl-1,3-butane diamine.

After mixing the prepolymer reaction products and catalyst to form the chemical foaming mixtures according to the above procedure, in each example the mixture was discharged through the reciprocating mixing head 16' onto a continuous carrier belt 22 as shown in FIG. 1. It was found that the temperature of the chemical foaming mixture was 35° F. at discharge. The foam mixture is covered with a cover sheet 23 and the carrier belt and cover sheet with the foam mixture contained therein is passed through a metering roll assembly 24. After the carrier belt 22 and cover sheet 23 pass through the metering roll assembly, gaseous expansion begins to occur within the foaming mixture contained therein, causing a foam sheet 25 to be formed between the carrier belt and the cover sheet. At this point the expanding mixture is passed through heating zones 26 to advance the chemical reaction of the mixture and to render the foam sheet 25 self-supporting and non-tacky by the time it reaches the outlet end of the apparatus. The carrier belt 22 and the cover sheet 23 are then stripped from the foam sheet 25, and the foam sheet is then passed to a festoon-type final curing zone 27. The resulting foam produced was characterized by a substantially uniform cellular structure thereby indicating that a homogeneous mixture was provided and that reaction took place substantially equally throughout.

The same procedure was carried out with prepolymers containing 100% substantially pure 2,4 toluene diisocyanate which has a freezing point of from 67° F. to 71° F., and with a prepolymer containing a mixture of 65% 2,4 toluene diisocyanate and 35% 2,6 toluene dissocyanate. This latter mixture had a freezing point of 48° F. to 42° F. This foam mixture also gave the same degree of control as did the former mixture when mixed according to the method of the invention, and resulted in high quality foam. Thus, by the "freezing point of the isocyanate compound" is meant the freezing point of the mixture of different isocyanates or the freezing point of a single isocyanate of the prepolymer reaction product containing 100% of one isocyanate.

I claim:

1. A method of preparing a chemical foaming mixture to produce quality foam comprising:
    (a) providing a fluid mixture prepolymer reaction product of a hydroxyl-containing resinous compound and a stoichiometric excess of an organic isocyanate compound which is capable of combining with said hydroxyl-containing compound to form polyurethane foam,
    (b) rapidly cooling the reaction product to a temperature below the freezing point of the isocyanate compound while simultaneously vigorously agitating the reaction product to prevent extended crystal growth during freezing of the isocyanate and provide minute isocyanate crystals which are insoluble in the hydroxyl-containing compound,
    (c) intimately mixing the reaction product containing frozen isocyanate with a catalyst mixture containing water and a catalyst for the reaction between water and the reaction product to form a chemical foaming mixture in which the reaction product is at a temperature low enough to retard gas generating during mixing, said minute isocyanate crystal formations being dispersed homogeneously throughout the chemical foaming mixtures,
    (d) discharging and spreading the resulting chemical foaming mixture before the temperature is raised to the point of gaseous reaction, and
    (e) reacting the foaming mixture by raising its temperature to above the reaction temperature.

2. A method of preparing a chemical foaming mixture according to claim 1 comprising continuously agitating the reaction product while maintaining it below the freezing point of the isocyanate.

3. A method of preparing a chemical foaming mixture according to claim 1 wherein the isocyanate compound comprises about an 80:20 mixture of 2,4 and 2,6 isomers of toluene diisocyanate and the reaction product is cooled with mixing to a temperature below about 23° F.

4. A method of preparing a chemical foaming mixture according to claim 1 wherein the chemical foaming mixture is spread on a carrier belt, metered to a uniform thickness, allowed to expand on a carrier belt until fully expanded and then is stripped from the carrier belt.

References Cited

UNITED STATES PATENTS 2,957,207  10/1960  Roop et al. _____ 264—54

OTHER REFERENCES

Du Pont Bulletin, Elastomer Chemicals Dept.: HR-7. "Hylene TM Organic Isocyanate," December, 1955, all pages.

Ferrigno, T. H.: Rigid Plastic Foams, New York Reinhold, © 1963, pp. 5–6.

Glasstone, Samuel: Textbook of Physical Chemistry. Second edition. Princeton, N.J., D. Van Nostrand, © 1946, pp. 745–750.

International Encyclopedia of Chemical Science. Princeton, N.J., D. Van Nostrand, © 1964, p. 304.

Weast, Robert C.: ed. Handbook of Chemistry and Physics. Forty-seventh edition. Cleveland, Ohio, Chemical Rubber Co., © 1966, p. F–64.

PHILIP E. ANDERSON, Primary Examiner

U.S. Cl. X.R.

18—5; 260—2.5; 264—47, 54

UNITED STATES PATENT OFFICE
CERTIFICATE OF CORRECTION

Patent No. 3,468,987                         September 23, 1969

John Willy

It is certified that error appears in the above identified patent and that said Letters Patent are hereby corrected as shown below:

Column 1, line 62, "Patents" should read -- Patent --. Column 2, line 16, "Wil" should read -- Will --. Column 3, line 68, "N′ -" should read -- N′ , --. Column 4, line 44, "The" should read -- This --; line 48, after "N′" cancel the hyphen; same line 48, "tetramethyl-" should read -- tetramethyl --; same line 48, "3-" should read -- 3 --. Column 5, line 5, "dissocyanate" should read -- diisocyanate --; line 6, "48°" should read -- 38° --; line 13, "containing" should read -- contains --.

Signed and sealed this 12th day of May 1970.

(SEAL)
Attest:

EDWARD M. FLETCHER, JR.                     WILLIAM E. SCHUYLER, JR.
Attesting Officer                                Commissioner of Patents